(12) United States Patent
DelMonaco et al.

(10) Patent No.: US 7,194,475 B2
(45) Date of Patent: Mar. 20, 2007

(54) METHOD, SYSTEM, AND PROGRAM FOR PERFORMING AN IMPACT ANALYSIS OF PROGRAM STATEMENTS IN AT LEAST ONE SOURCE CODE FILE

(75) Inventors: John Carl DelMonaco, Wilmette, IL (US); Laurence Edward England, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 811 days.

(21) Appl. No.: 10/003,952

(22) Filed: Oct. 30, 2001

(65) Prior Publication Data

US 2003/0084063 A1 May 1, 2003

(51) Int. Cl.
*G06F 17/30* (2006.01)

(52) U.S. Cl. ............... 707/102; 707/103 R; 707/104.1; 707/203; 709/221; 717/121

(58) Field of Classification Search ................ 707/102, 707/203, 103 R, 104.1; 709/206, 221; 714/38; 717/121, 128
See application file for complete search history.

(56) References Cited

U.S. PATENT DOCUMENTS

| | | | |
|---|---|---|---|
| 4,864,569 A | 9/1989 | DeLucia et al. | |
| 5,418,957 A | 5/1995 | Narayan | |
| 5,452,449 A * | 9/1995 | Baldwin et al. | ............ 707/102 |
| 5,495,610 A | 2/1996 | Shing et al. | |
| 5,724,556 A | 3/1998 | Souder et al. | |
| 5,812,849 A | 9/1998 | Nykiel et al. | |
| 5,898,872 A | 4/1999 | Richley | |
| 6,003,039 A | 12/1999 | Barry et al. | |
| 6,003,042 A * | 12/1999 | Melahn | ...................... 707/203 |
| 6,058,264 A | 5/2000 | Glaser | |
| 6,071,217 A | 6/2000 | Barnett | |
| 6,071,317 A | 6/2000 | Nagel | |
| 6,098,072 A | 8/2000 | Sluiman et al. | |
| 6,105,036 A | 8/2000 | Henckel | |
| 6,182,246 B1 | 1/2001 | Gregory et al. | |
| 6,223,185 B1 | 4/2001 | Berkland et al. | |
| 6,247,020 B1 | 6/2001 | Minard | |
| 6,438,560 B1 | 8/2002 | Loen | |
| 6,546,477 B1 | 4/2003 | Russo et al. | |
| 6,658,421 B1 | 12/2003 | Seshadri | |
| 6,691,298 B1 | 2/2004 | Russo et al. | |
| 6,820,184 B2 | 11/2004 | Russo et al. | |
| 6,928,643 B2 | 8/2005 | McGoogan et al. | |
| 6,957,415 B1 | 10/2005 | Bouchard et al. | |
| 7,069,547 B2 | 6/2006 | Glaser | |

FOREIGN PATENT DOCUMENTS

WO      0023882      4/2000

OTHER PUBLICATIONS

H. Basson, "An Integrated Model for Impact Analysis of Software Change", Laboratoire Informatique de Littoral.

(Continued)

*Primary Examiner*—Shahid Alam
(74) *Attorney, Agent, or Firm*—David W. Victor; Konrad Raynes & Victor LLP

(57) ABSTRACT

Provided is a method, system, and program for performing an impact analysis of program statements in a source code file, wherein each program statement has at least one of an input parameter and output parameter. A selection is received of at least one program statement in the source code file. For each selected program statement, a determination is made of program statements in the source code file having as one input parameter one program artifact that is affected by the selected program statement.

57 Claims, 7 Drawing Sheets

OTHER PUBLICATIONS

B. Dellen, et al., "Change Impact Analysis Support for Software Development Processses", International Journal of Applied Software Technology, vol. 4, No. 2/3, pp. 95-109.

R.J. Turver, et al., "An Early Impact Analysis Technique for Software Maintenance", Software Maintenance: Research and Practice, 1994, vol. 6, pp. 35-53.

J.P. Queille, et al., "The Impact Analysis Task in Software Maintenance: A Model and a Case Study", IEEE, 1994, pp. 234-242.

S. A. Bohner, "Impact Analysis is the Software Change Process: A year 2000 Perspective", IEEE, 1996, pp. 42-51.

J. Han, "An Approach to Software Change Management Support", Proc. 15th IASTED International Conference, Applied Informatics, Feb. 1997, pp. 322-325.

D. E. Fyock, "Using Visualization to Maintain Large Computer Systems", IEEE Computer Graphics and Applications, Jul./Aug. 1997, pp. 73-75.

Microsoft Corp., "Integrated Development Environment (IDE) Integration" [online], 1997, pp. 1, [Retrieved on Oct. 2001]. Retrieved on the Internet at <URL: http://msdn.microsoft.com/library/en-us/dvnss/html/msdn_ide.asp?frame =true>.

M. Noguchi, et al., Software Maintenance Support Tool Set, Nippon Steel Technical Report, No. 76, Mar. 1998, pp. 69-73.

M.J. Fyson, et al., "Using Application Understanding to Support Impact Analysis", Software Maintenance: Research and Practice, 1998, vol. 10, pp. 93-110.

M. Hutchins, et al., "Improving Visual Impact Analysis", IEEE, 1998, pp. 294-303.

A. Cimitile, et al., "Software Model for Impact Analysis: A Validation Experiment", IEEE, 1999, pp. 212-222.

IBM, "SCLM: IBM's Best Kept Secret", [online], pp. 1-23; [Retrieved on Oct. 2001]. Retrieved on the Internet at <URL: http://www-4.ibm.com/software/ad/ispf/library/tr292194.html>.

Microsoft Corp., "Visual SourceSafe Managing Source Code by Project" [online], pp. 1. [Retrieved on Oct. 2001]. Retrieved on the Internet at <URL: http://msdn.microsoft.com/SSAFE/technical/managing.asp>.

J. DelMonaco, et al., "IBM Websphere Studio Asset Analyzer: Overview", IBM, 2001, pp. 1-11.

Factor, M., A. Schuster, and K. Shagin, "Instrumentation of Standard Libraries in Object-Oriented Languages: The Twin Class Hierarchy Approach", Proceedings of the 19th Annual ACM SIGPLAN Conference on Object-Oriented Programming, Systems, Languages, and Applications, Oct. 2004, pp. 288-300.

Galler, G.N., (Ed.), "Summer 2001 IMS Newsletter", [online], Nov. 2000, [Retrieved on Dec. 5, 2004], retrieved from the Internet at <URL: http://www-306.ibm.com/software/data/ims/quarterly/Summer2...>, 26 pp.

Harrold, M.J., J.D. McGregor, and K.J. Fitzpatrick, "Incremental Testing of Object-Oriented Class Structures", Proceedings of the 14th International Conference on Software Engineering, 1992, pp. 68-80.

IBM Corporation, "Using ISPF/SCLM for Automated and Controlled Software Development", SG24-4843-00, Oct. 1996, 234 pp.

Kahm, L., "Using WebSphere Studio Asset Analyzer", IBM RedBook, SG24-6065-00, Mar. 2004, 225 pp.

Mens, K., T. Mens, and M. Wermelinger, "Maintaining Software Through Intentional Source-Code Views", Proceedings of the 14th International Conference on Software Engineering and Knowledge Engineering, 2002, pp. 289-296.

Xiaoguang, Z., W. Dongmu, and H. Bingrong, "An Object-Oriented Data Framework for Virtual Environments with Hierarchical Modeling", ACM SIGSOFT Software Engineering Notes, vol. 24, Iss. 1, Jan. 1999, pp. 65-68.

\* cited by examiner

METHOD, SYSTEM, AND PROGRAM FOR PERFORMING AN IMPACT ANALYSIS OF PROGRAM STATEMENTS IN AT LEAST ONE SOURCE CODE FILE

RELATED APPLICATION

This application is related to the copending and commonly assigned patent application entitled "Method, System, And Program For Utilizing Impact Analysis Metadata of Program Statements in a Development Environment", having Ser. No. 10/003,950, filed on the same date herewith, and incorporated herein by reference in its entirety.

BACKGROUND OF THE INVENTION

1. Field of the Invention

The present invention relates to a method, system, and program for performing an impact analysis of program statements in at least one source code file.

2. Description of the Related Art

One of the challenges when editing code in a program is to understand the effect of changes to certain lines of code to other parts of the program. In the prior art, software developers use a debugging tool to "step" through the program and determine all the execution paths. Based on the information of the execution characteristics determined by "stepping" through the program, the developer can then analyze the execution path to determine the effect the proposed changes to certain statements may have on the current operation of the program including the program statements to change. This process is manually intensive and is based on the capabilities of the developer to properly observe all the effects the proposed changes will have on the execution characteristics.

Moreover, a change in one program may affect the operations of another external application by modifying the content of a shared resource, such as a global variable, memory, file, database record, etc. Currently there is no integrated approach for determining the effects of a proposed change to code on the operation of external applications. In fact, a debugger typically only is aware of the application currently executing, and not the effects on an external application.

In the current art, the software developer is often unable to ascertain the impact of code modifications to the application including the modified code and to external applications, until errors and bugs are detected. At such point, the developer may then have to spend considerable time tracking down the source of the problem to the code change that was made. This problem is further exasperated if the negative impact of a code change is realized in an external application, where the developer or system manager may be totally unaware of the changes made because they were made in a different application. In such case, time will be spent tracking the source of the error to another application, and then to a particular code change in the external application.

For these reasons, there is a need in the art for improved software development tools that assist developers in understanding the impact of modifications to a source program.

SUMMARY OF THE PREFERRED EMBODIMENTS

Provided is a method, system, and program for performing an impact analysis of program statements in a source code file, wherein each program statement has at least one of an input parameter and output parameter. A selection is received of at least one program statement in the source code file. For each selected program statement, a determination is made of program statements in the source code file having as one input parameter one program artifact that is affected by the selected program statement.

Further provided is a method, system, and program for performing an impact analysis of program statements in a source code file that is one of a plurality of source code files, wherein each program statement has an input parameter and output parameter. Selection is received of at least one program statement in one source code file. For each selected program statement, a determination is made of program statements throughout the source code files having as one input parameter one program artifact that is affected by the selected program statement.

In further implementations, the program artifact comprises a variable, Input/Output buffer or file.

Still further, one program statement has one input parameter that is affected by the selected program statement if the output parameter program artifact of the selected program statement is the input parameter program artifact to the program statement.

Yet further provided is a method, system, and program for maintaining data on a plurality of source code files. A data store is generated for each source code file and for each program statement in the source code file by generating information on the program statement and generating information on each program artifact referenced as an input parameter in the program statement. Information is further generated on each program artifact referenced as an output parameter in the program statement. The data store is then used to determine program artifacts throughout all of the source code files capable of being affected by any one program statement in any of the source code files.

The described implementations provide a technique for determining the impact that a change to a selected program statement in one source code file may have on program statements in the source code file including the selected statement and in other source code files. In this way, a software developer may have information on all program statements and program artifacts in one or more source code files that may be affected by changing a selected program statement.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
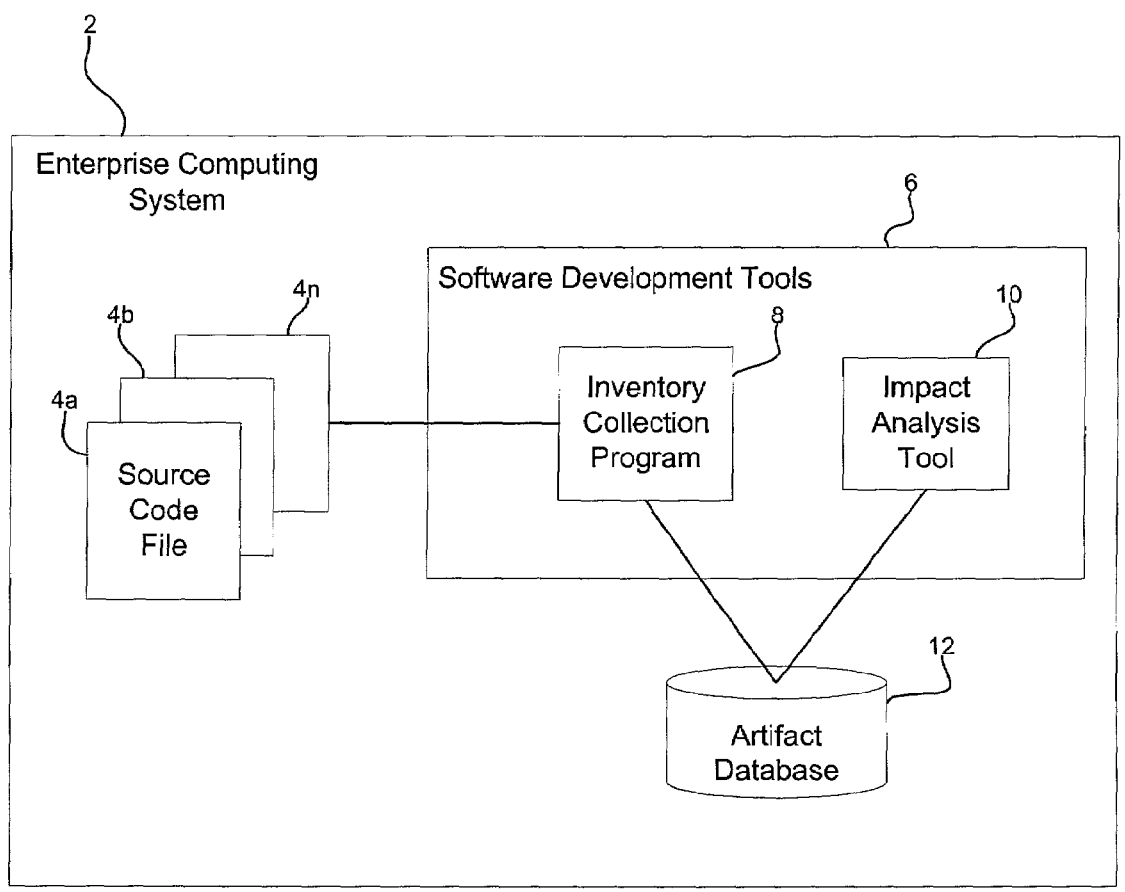
FIG. 1 illustrates a computing environment in which aspects of the invention are implemented in accordance with implementations of the invention.

FIG. 1 illustrates an enterprise computing system 2 which would be implemented across a network environment including one or more server and client computer systems, comprising any type of computing devices known in the art, e.g., workstations, servers, personal computers, mainframes, hand held computers, laptops, personal information managers (PIMs), telephony devices, etc. A plurality of source code files 4a, 4b . . . 4n are maintained in the enterprise computing system 2 and available to a set of software development tools 6 that are implemented on one or more of the computer systems in the enterprise computing system 2. The source code files 4a, 4b . . . 4n would comprise the source code of application programs used in the enterprise computing system 2 or being developed for deployment in enterprise computing systems.

The source code files 4a, 4b . . . 4n may also include a job control language (JCL) program that includes program statements that call and execute application programs in the system and associates logical and physical entities. For instance, within an application, a logical data set name may be used to reference or call a physical data set. The JCL program provides the association of the logical data set to the physical data set. In fact, the same logical name may be used to reference different physical data sets. The JCL association of physical and logical entities is examined when performing the impact analysis to determine how code modifications can affect a physical data set and, in turn, the statements that reference that physical data set. A set of JCL statements may specify the input data sets (files) to access, output data sets to create or update, resources to allocate for the job, and the programs that are to run using the defined input and output data sets.

The source code files 4a, 4b . . . 4n may be stored in specific file directories or maintained and managed by a source control management system known in the art, such as the International Business Machine Corporation's (IBM) Software Configuration and Library Manager (SCLM), Microsoft Visual SourceSafe, etc.** The source code files 4a, 4b . . . 4n may comprise component files of one or more application programs, where each application program is comprised of one or more source code files. A source control management system provides a library management system of source code and controls access and provides locking to prevent developer conflicts. An example of a source control management system that may be used to manage developer access to the source code files 4a, 4b . . . 4n is described in the IBM publication "Using ISPF/SCLM for Automated and Controlled Software Development", IBM publication no. SG24-4843-00 (IBM Copyright, October 1996), which publication is incorporated herein by reference in its entirety.

**Microsoft and Visual SourceSafe are trademarks of Microsoft Corporation in the United States, other countries, or both; IBM is a registered trademark of International Business Machines Corporation in the United States, other countries, or both.

The enterprise computing system 2 further includes a set of software development tools 6 deployed on one or more systems to assist software developers in modifying and updating the source programs 4a, 4b . . . 4n. The software development tools 6 include an inventory collection program 8 that scans and analyzes all the source programs 4a, 4b . . . 4n and generates an artifact database 12 providing metadata on all the program statements and program artifacts referenced in the source programs 4a, 4b . . . 4n. A program artifact may comprise a program statement, program variable, Input/Output buffers, files, data sets, or any other data structure known in the art manipulated by a computer program. Once the inventory collection program 8 generates the artifact database 12, then an impact analysis tool 10 may be invoked to analyze any block of statements in any of the source programs 4a, 4b . . . 4n. This analysis of the block of statements would generate a report on all the program statements and program artifacts across all of the source programs 4a, 4b . . . 4n that could possibly be affected by any change to the selected block of statements.

Figure 2:
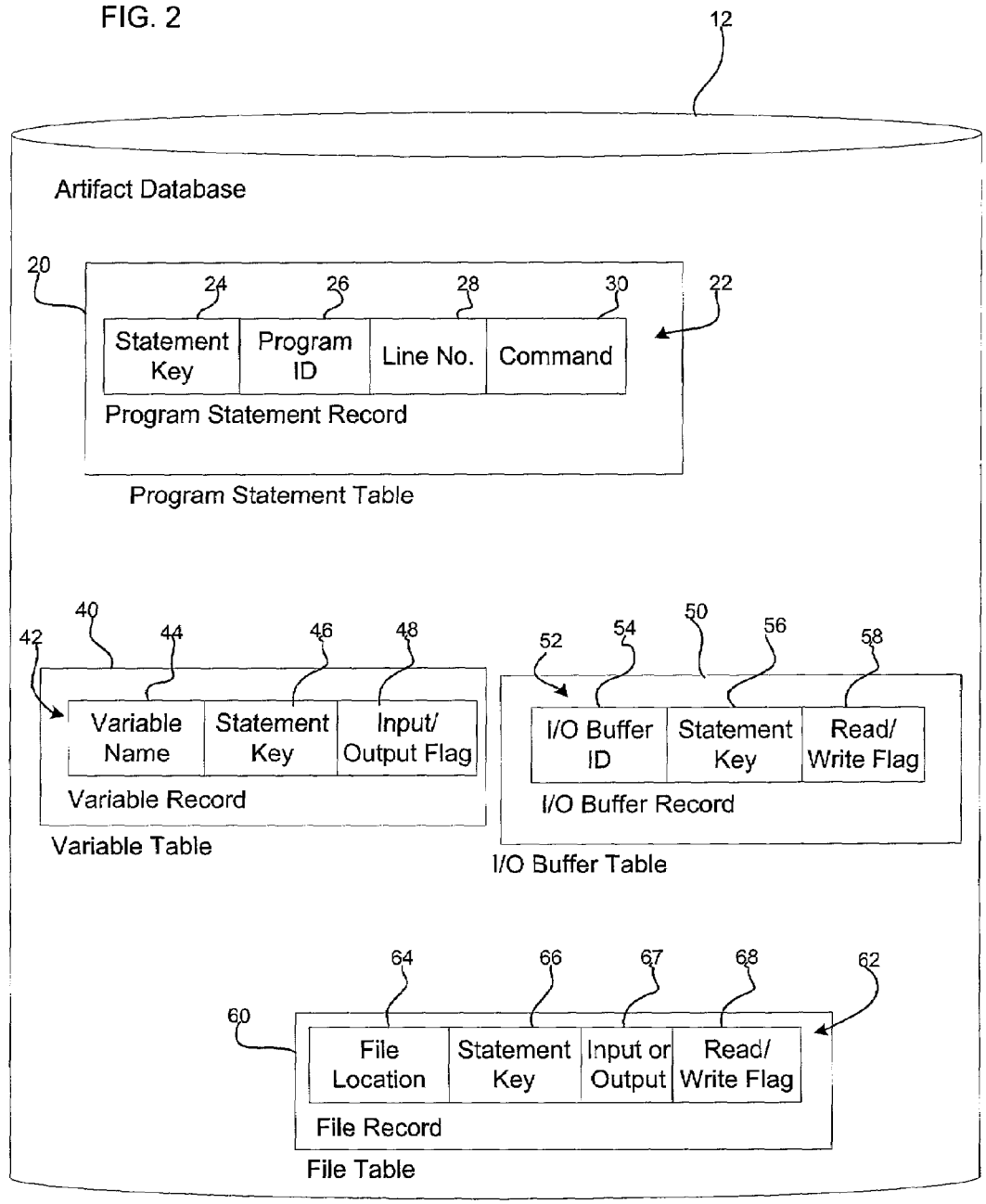
FIG. 2 illustrates data structures maintaining information on program statements and program artifacts throughout source code files in accordance with certain implementations of the invention.

FIG. 2 illustrates a relational database implementation of the artifact database 12 maintaining the artifact elements gathered from the source code files 4a, 4b . . . 4n. The artifact database 12 includes a program statement table 20, a variable table 40, an I/O buffer table 50, and a file table 60. The program statement table 20 includes one record 22 for each program statement in each source code file 4a, 4b . . . 4n. Each program statement record 22 includes a unique statement key 24, a program identifier (ID) 26 uniquely identifying the source code file 4a, 4b . . . 4n including the statement, the line number 28 in the source code file 4a, 4b . . . 4n including the statement, and the statement command name or verb 30. If a line of code includes multiple statements, i.e., verb and input and output parameters, then multiple statement records 22 would be generated for that line of code. The program ID 26 may comprise the file name of the source code file 4a, 4b . . . 4n or, if the program is maintained in a source control management system, then the program ID 26 may comprise the identifier of source code file 4a, b . . . n in the source control management system library.

The variable table 40 includes one variable record 42 for each instance a variable is referenced in a program statement in any of the source code files 4a, 4b . . . 4n. Each variable record 42 includes a variable name 44, the unique statement key 46 of the program statement in which the variable was referenced, and an input/output flag 48 indicating whether the variable was input to the program statement or the output/target of the program statement and possibly modified. The I/O buffer table 50 includes an I/O buffer record 52 for each instance of a read or write operation to an I/O buffer in a program statement in any of the source code files 4a, 4b . . . 4n. Each I/O buffer record 52 includes the identifier of the allocated I/O buffer 54, the unique statement key 56 of the program statement operating on the I/O buffer, and a read/write flag 58 indicating whether the program statement performed a read or write with respect to the I/O buffer. The file table 60 includes a file record 62 for each instance of a read or write operation to a file in a program statement in any of the source code files 4a, 4b . . . 4n. Each file record 62 includes the identity of the effected file 64, the unique statement key 66 of the statement operating on the file, an Input/Output flag 67 indicating whether the statement performed an input or output with respect to the source code file 4a, 4b . . . 4n, and a read/write flag 68 indicating whether the statement performed a read or write with respect to the file.

Figure 3:
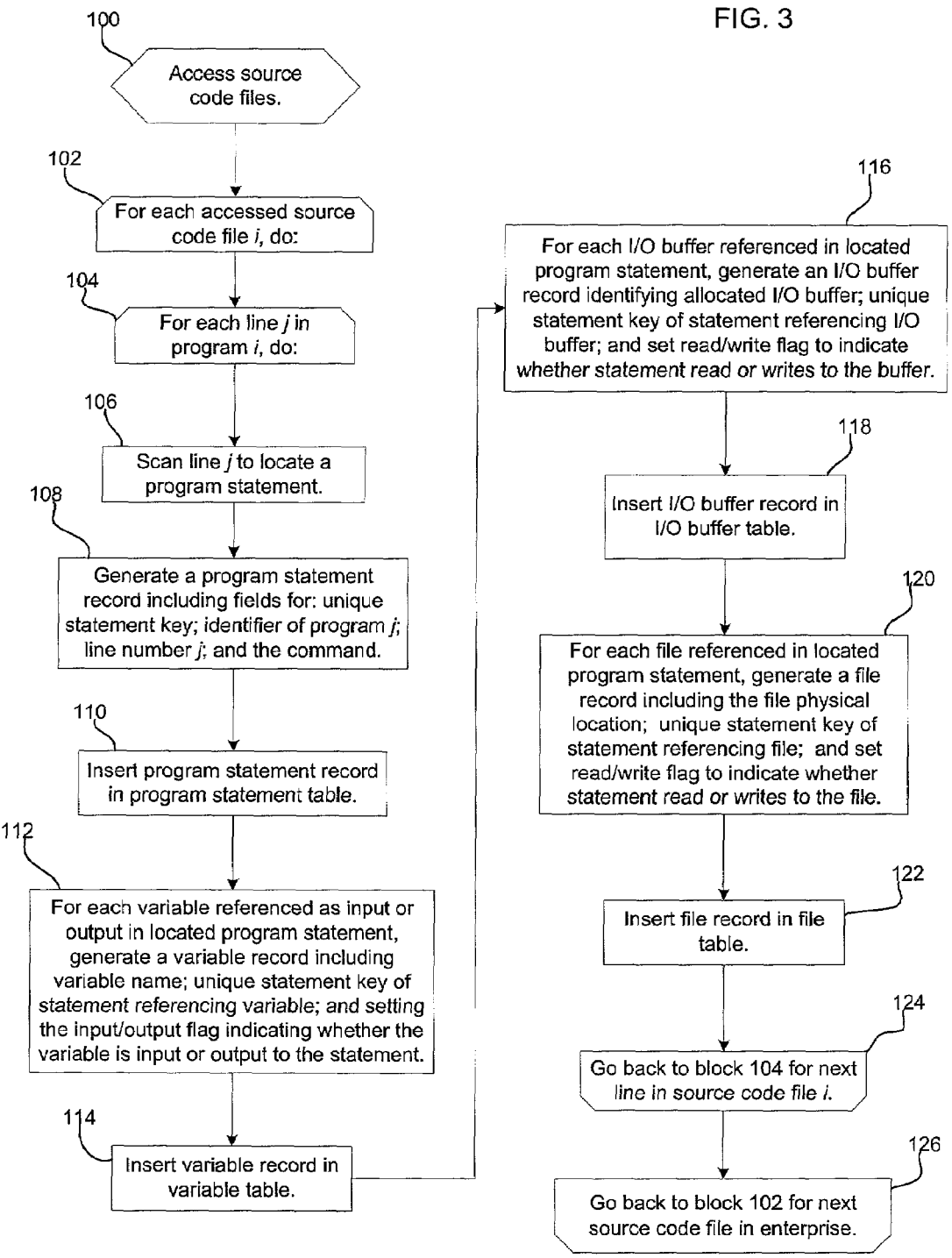
FIG. 3 illustrates logic to process source code files to populate the data structures described with respect to FIG. 2 in accordance with certain implementations of the invention.
Figure 4:
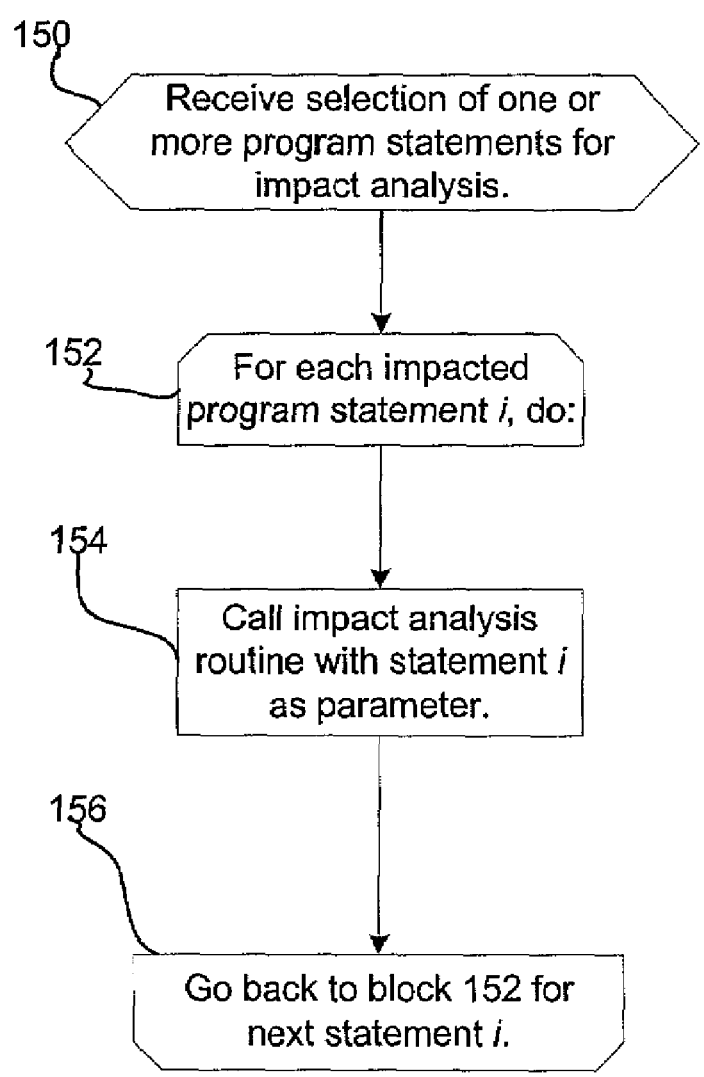
FIGS. 4, 5*a*, 5*b*, and 5*c* illustrate logic to determine the effect a change to selected source code statements may have on statements and program artifacts in source code files in accordance with certain implementations of the invention.

FIG. 3 illustrates logic implemented in the inventory collection program 8 to populate the artifact database 12 with program artifact metadata. The logic of FIG. 3, as well as the logic of FIGS. 4, 5a, 5b, and 5c would be executed by one or more computer systems on which the software development tools are installed. Control begins at block 100 by accessing all the source code files 4a, 4b . . . 4n subject to the analysis, either through the file directory or by accessing the source code files 4a, 4b . . . 4n through a control management system. A loop is then performed at block 102 through block 126 for each source code file i to consider. At blocks 104 through 124, the inventory collection program 8 performs a loop for every line j in the source code file i, from the top to bottom of the code. The inventory collection program 8 scans (at block 106) line j for a program statement. If there are multiple program statements in the line, then the steps 108 through 122 will be performed for each statement in the line, where a statement comprises a command verb and an input and output program artifact, e.g., variable, I/O buffer, file, etc., acted upon by the program statement. A program statement record 22 is generated including fields having: the unique statement key 24, which would be generated with the record; the program identifier 26; line number j 28; and the command verb 30, which may comprise a command specifying a particular operation to be performed on the input and output parameters or a call to a subroutine within the source code file i or to a routine in an external source code file 4a, 4b . . . 4n. Block 110 then inserts the generated program statement record 22 is then inserted into the program statement table 20 in the artifact database 12.

For each variable referenced as an input or output parameter in the located program statement, the inventory collection program 8 generates (at block 112) a variable record 42 including: the variable name 44, the unique statement key 46 identifying the program statement referencing the variable as an input or output parameter, and sets the Input/Output flag 48 to indicate whether the variable is an input parameter or output parameter to the statement. The generated variable record 42 is inserted (at block 114) into the variable table 40. For each I/O buffer referenced in the program statement, an I/O buffer record 52 is generated (at block 116) including an identifier of the I/O buffer 54, the statement key 56 of the program statement operating on the I/O buffer as a parameter; and a read/write flag 58 indicating whether the program statement performs a read or write operation with respect to the I/O buffer. The generated I/O buffer record 52 is then inserted (at block 118) into the I/O buffer table 50. For each file referenced in the program statement, a file record 62 is generated (at block 120) including an identifier of the file 64 (such as the physical location of the file in the file system), the statement key 66 of the program statement operating on the file, an Input/Output flag 67, and a read/write flag 68 indicating whether the statement performs a read or write operation with respect to the file. The generated file record 62 is then inserted into the file table 60.

At block 124, control proceeds back to block 104 to process the next line of the source code file i. After processing all the lines in the source code file i, control proceeds (at block 126) back to block 102 to process the next source code file 4a, 4b . . . 4n being considered. The result of the logic of FIG. 3 is an artifact database 12 populated with metadata about all statements in the source code files 4a, b . . . n and all program artifacts that are affected by the statements. The inventory collection tool 8 may update the artifact database 12 if one source code file 4a, 4b . . . 4n is changed. This update may be performed by removing all records that reference the updated source code file 4, b . . . n and then performing the logic of FIG. 3 to add the metadata on all the program artifacts back to the artifact database 12.

Figure 5A:
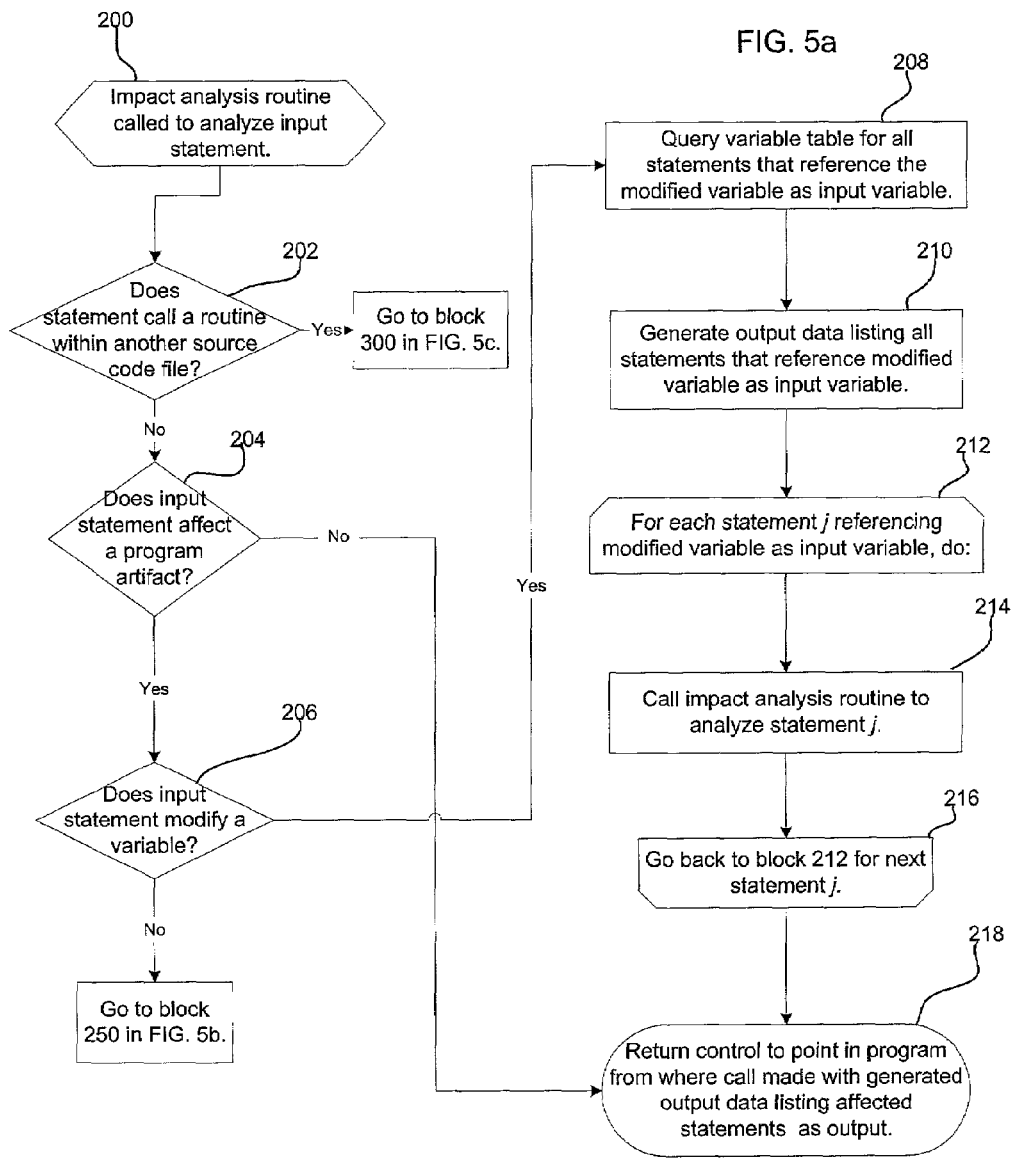
Figure 5B:
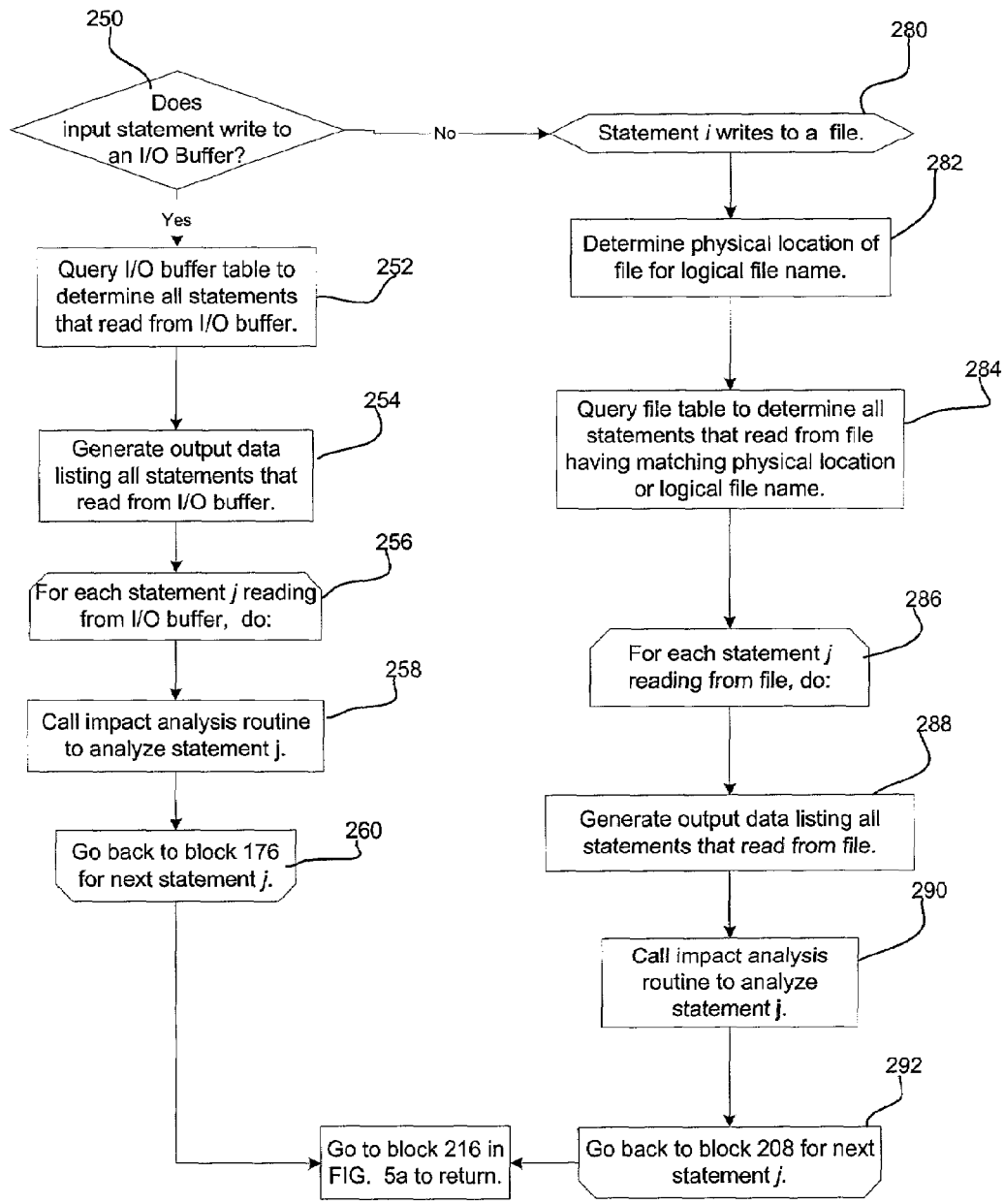
Figure 5C:
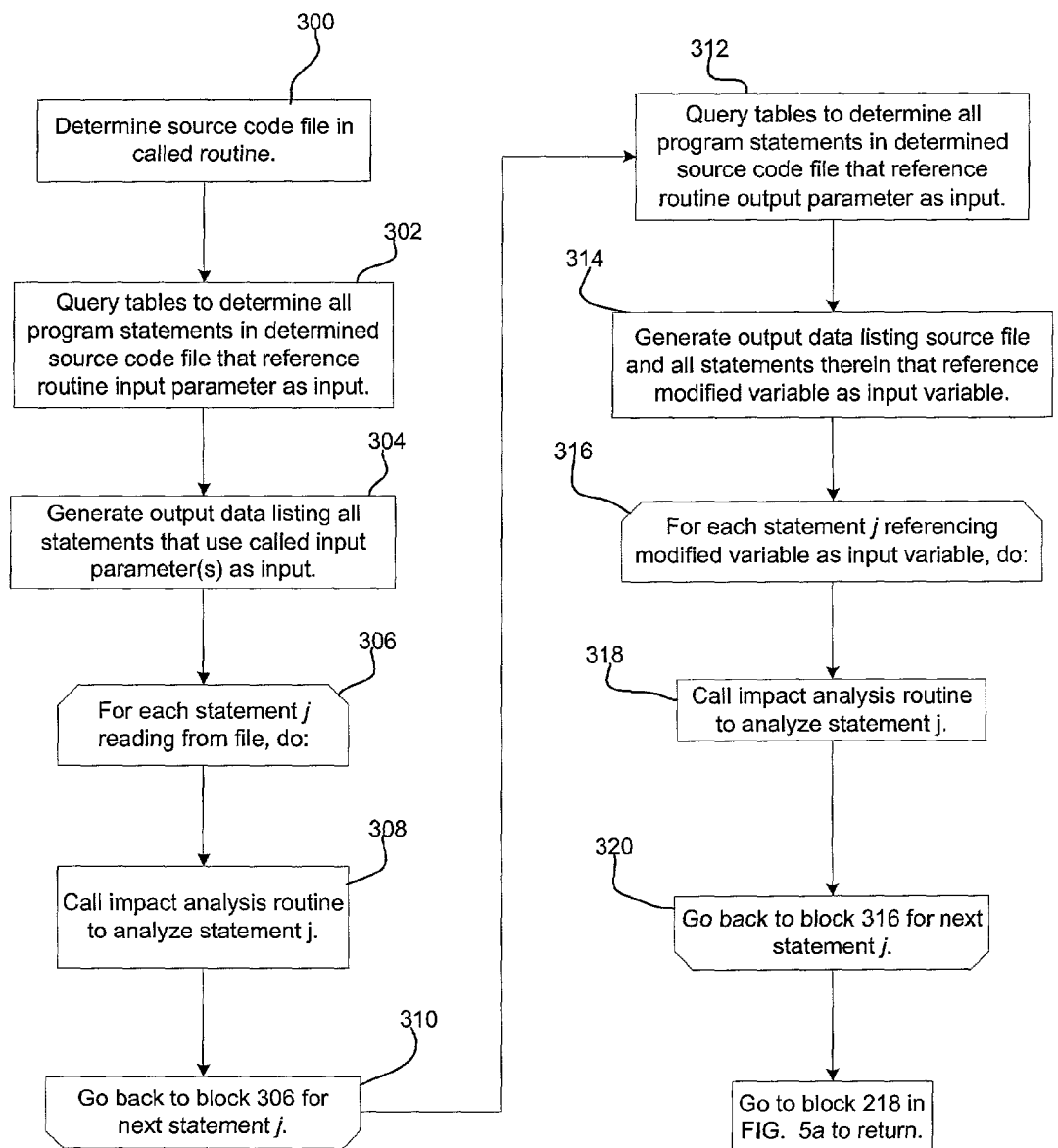

FIGS. 4, 5a, 5b, and 5c illustrate logic implemented in the impact analysis tool 10 to query the artifact database 12 to determine all program artifacts across all the source code files 4a, 4b . . . 4n that may be affected by a change to a selected one or more program statements in one source code file 4a, 4b . . . 4n. As discussed, the user may select one or more lines of code in one source code file 4a, 4b . . . 4n for the impact analysis tool 10 to consider. Control begins at block 150 in FIG. 4 upon receiving a call to the impact analysis tool 10 and selection of one or more program statements to subject to impact analysis. For each of the program statements subject to analysis, a loop is performed at blocks 152 through 156. At block 154, an impact analysis routine is called with statement i as an input parameter to determine all program artifacts directly and indirectly affected by statement i FIGS. 5a, 5b, and 5c illustrate the logic of the impact analysis routine.

At block 200 in FIG. 5a. a call is made to the impact analysis routine to analyze an input program statement. If (at block 202) the input program statement does not call another routine within the same or external source code file 4a, 4b . . . 4n and if (at block 204) the input program statement affects a program artifact, then a determination is made at block 206 of whether the input statement modifies a variable. An input program statement would not affect a program artifact if it does not modify the program artifact, such as the case if the input program statement specifies that data be sent to a printer or other output device that does not modify any other variable, file or I/O buffer. If the input program statement modifies an input variable (from the yes branch of block 206), then the impact analysis routine would query (at block 208) the variable table 40 to determine all statements that reference the modified variable, i.e., have the same variable name 44, as an input parameter, i.e., the Input/Output flag 48 is set to indicate input. An output data listing of all statements that reference the modified variable as an input parameter is produced (at block 210). At blocks 212 through 216, for each statement j referencing a modified variable as an input variable, the impact analysis routine makes a recursive call (at block 214) to the impact analysis routine, which begins at block 200, with statement j as an input variable to determine all program artifacts that statement j, which has as an input parameter a variable affected directly by the program statement i or indirectly by another program statement affected by the program statement i. After control is returned from the nested call to the impact analysis routine, control proceeds to block 218 to return control to the point in the program where the call to the impact analysis routine was made, which may be at block 154 in FIG. 4 or within a nested call within FIGS. 5a, 5b, 5c from where the impact routine was called. Control is returned with information output indicating all the directly and indirectly affected program statements.

If (at block 206) the input program statement does not modify a variable and if (at block 250) the input program statement does write to a target I/O buffer, then the impact analysis routine queries (at block 252) the I/O buffer table 50 to determine all I/O buffer records 52 identifying the target I/O buffer and that indicate in the read/write flag 58 that the statement reads from the I/O buffer. From the determined I/O buffer records 52, the impact analysis routine determines and generates output data (at block 254) of all statements read from the target I/O buffer as indicated from the statement key 56 value in the determined I/O buffer records 52. The routine generates output data indicating all program statements that read from the affected I/O buffer. A loop is then performed at blocks 256 through 260 for each program statement reading from an I/O buffer affected by the input program statement. At block 258, the impact analysis routine is called (at block 200 in FIG. 5a) with one determined program statement that reads from the affected I/O buffer as an input parameter to determine all further program artifacts affected by the program statement reading from the affected I/O buffer.

If (at block 250) the input program statement does not write to an I/O buffer, then the impact analysis routine assumes that the input statement writes to a file (at block 280), which is the last program artifact to consider in the logic of FIGS. 5a, 5b, and 5c. Those skilled in the art will appreciate that the logic of FIGS. 5a, 5b, and 6c can be extended to consider the effect on program artifacts other than variables, I/O buffers, and files. At block 282, the impact analysis routine determines the physical location of the file in the file system if the statement operates on a logical file name. Such physical location may be provided by a declaration in the source code file i or an external job control language program defining a logical name associated with a physical file. At block 284, the impact analysis routine queries the file table 60 to determine all file records 62 identifying the target file modified by the statement and that indicate in the read/write flag 68 that the statement reads from the file. From the determined file records 62, the impact analysis routine determines statements that read from the target file from the statement key 66 value in the determined file records 62. The routine generates output data indicating all statements that read from the affected I/O buffer. A loop is then performed at blocks 286 through 290 for each program statement reading from an I/O buffer affected by the input statement. At block 288, the impact analysis routine is called (at block 200 in FIG. 5a) with one determined program statement that reads from the affected file as an input parameter to determine all further program artifacts affected by the program statement reading from the affected file. From blocks 260 or 292, control proceeds to block 218 to return to the point in the program execution where the call to the impact analysis routine was made.

If (at block 204) the input statement does not affect a program artifact, such as the case if the statement writes data to a printer, display monitor, etc., then control proceeds to block 218 to return control to the point in the program execution where the call to the impact analysis routine was made. If (at block 202) the input statement calls a routine within the same or another source code file 4a, 4b . . . 4n, then control proceeds to block 300 in FIG. 5c to determine the impact from modifying a program statement including a call to another program routine comprised of one or more program statements.

With respect to FIG. 5c, at block 300, the impact analysis routine determines the source code file including the called routine. The program statement table 20 is then queried (at block 302) to determine all program statement records 22 that reference the input parameter of the called routine as input. This operation is performed to determine all statements in the called routine that may use the routine input parameter to affect other program artifacts. This determination of statements in the called routine that use the input parameter as input can be determined by a query of the variable table 40, I/O buffer table 50, and file table 50 of all table records 42, 52, and 62 having a statement key 46, 56, or 66 identifying a statement in the called source code file 4a, 4b . . . 4n (previously determined by a query of the program statement table 20 for all program statement records 22 including the called source code file as the program ID 26 and whose input/output flag 48, 58, or 68 indicates that the input parameter is input to the program statement. Output is then generated (at block 304) of all statements that use the called input parameter as input. For each determined statement j referencing the input parameter as input, a loop is performed at blocks 306 through 310 where the impact analysis routine is called (at block 308) to determine all program artifacts affected by statement j.

The impact analysis program than determines at blocks 312 through 320 the impact on all program statements that reference the output parameter of the called routine as input, i.e., that may use the parameter affected by the called routine. At block 312, the impact analysis routine queries the tables 20, 40, 50, 60 to determine all program statement records 22 that reference the output parameter of the called routine as input. This can be determined by a query of the variable table 40, I/O buffer table 50, and file table 50 of all table records 42, 52, and 62 having a statement key 46, 56, or 66 identifying a statement in the called source code file 4a, 4b . . . 4n (previously determined by a query of the program statement table 20 for all program statement records 22 including the called source code file as the program ID 26) and whose input/output flag 48, 58, 68 indicates that the output parameter to the routine is input to the statement. Output is then generated (at block 314) of all routine statements that use the called output parameter as input. For each determined statement j referencing the routine output parameter as input, a loop is performed at blocks 316 through 320 where the impact analysis routine is called (at block 318) to determine all program artifacts affected by statement j.

The resulting output of a call to the impact analysis tool 10 to analyze one or more statements in a source code file 4a, b . . . n is a list of all program statements that reference an input parameter that may be affected by a modification to the analyzed statement. This output lists statements referencing as input a program artifact that is directly affected by the analyzed statement as well as program artifacts indirectly affected, i.e., statements that reference an input program artifact that was affected by a statement referencing an input parameter affected by the analyzed statement, etc. From block 320, control proceeds to block 218 in FIG. 5a to return control to the point in the program from where the call to the impact analysis routine was generated.

In further implementations, the impact analysis tool 10 may also generate extended information explaining the source of the affect on a listed program statement. As discussed, at block 210, 254, 288, and 314 in FIGS. 5a, 5b, and 5c, the impact analysis tool 10 generates output data listing all program statements that reference a modified program artifact as an input statement. Thus, when generating information at this point, the impact analysis tool 10 may further generate extended information for an affected program statement identifying the previous program statement that modifies the program artifact used as the input statement by the affected program statement and also provide information on the exact transformation performed by the previous program statement that modifies the program artifact used as the input statement.

After the impact analysis tool 10 generates the output of affected source code files and program statements therein, the software developer may review the output listing of affected statements across all files 4a, 4b . . . 4n to determine what impact the proposed changes will have on all the different application programs comprised of one or more of the source code files 4a, 4b . . . 4n that include the affected statements.

The resulting output of a call to the impact analysis tool 10 to analyze one or more statements in a source code file 4a, b . . . n is a list of all program statements that reference an input parameter that may be affected by a modification to the analyzed statement. This output lists statements referencing as input a program artifact that is directly affected by the analyzed statement as well as program artifacts indirectly affected, i.e., statements that reference an input program artifact that was affected by a statement referencing an input parameter affected by the analyzed statement, etc. The software developer may review the output listing of affected statements across all files 4a, 4b . . . 4n, which are part of one or more application programs, to determine what impact the proposed changes will have on all the different programs, including the application program source code file having the affected statement. The related application entitled "Method, System, and Program for Utilizing Impact Analysis Metadata of Program Statements in a Development Environment", having docket no. SVL920010016US1, incorporated by reference above, provides further details on how the impact analysis tool 10 may be invoked and use as part of an integrated development environment.

Additional Implementation Details

The preferred embodiments may be implemented as a method, apparatus or article of manufacture using standard programming and/or engineering techniques to produce software or code. The term "article of manufacture" as used herein refers to code or logic implemented in a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations of FIG. 2, the database comprised a relational database having a separate program statement table and a separate table for each considered program artifact. Those skilled in the art will appreciate that the statement and program artifact data in the tables of FIG. 2 may be implemented in an any type of data store known in the art, such as a relational database having a different table and record structure, a database system other than a relational database as described herein (e.g., an object oriented database), a flat file or one or more files or data structures.

In further implementations, the records in the artifact database 12 may include additional fields concerning more detail on the format and structure of the program artifacts and their relationship to one another. Additionally, the tables and fields in the tables described with respect to FIG. 2 may have additional fields or have the data implemented in tables in a different manner.

The described implementations discussed an impact analysis performed with respect to program artifacts comprising an affected I/O buffer, file and variable program. In further implementations, additional program artifacts or data structures known in the art may be subject to the impact analysis.

The described implementations discussed an impact analysis of a selected statement on program statements in the source code file including the selected statement and in other source code files. Additionally, the impact analysis of the present invention may be used to determine the impact of a selected program statements on program statements within the source code file including the selected program statements, and not in any other source code files.

The described implementations may be utilized to maintain metadata on the program artifacts on any number of designated programs. Further, the source code files 4a, 4b . . . 4n and software development tools described herein do not have to be implemented in an enterprise computing system. Additionally, the source code files 4a, 4b . . . 4n and software development tools 6 may be maintained at a single computer workstation, where the tools 6 are deployed when modifying any of the source code files 4a, 4b . . . 4n.

The described logic of FIGS. 3, 4, 5a, 5b, and 5c describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for performing an impact analysis of program statements in a source code file that is one of a plurality of source code files, wherein each program statement has at least one of an input parameter and output parameter, comprising:

receiving selection of at least one program statement in one source code file; and for each selected program statement, determining program statements throughout the source code files having as one input parameter one program artifact that is affected by the selected program statement, wherein recursive calls are made for determining the program statements throughout the source code files having as one input parameter one program artifact that is affected by the selected source program statement, wherein determining the program statements having as one input parameter one program artifact affected by the selected program statement further comprises:

for each previously determined program statement having as one input parameter one program artifact affected by the selected program statement, performing the steps of:

(i) determining the output parameter program artifact of the statement; and (ii) determining program statements in the source code files having as one input parameter the program artifact that is the output parameter of the previously determined statement.

2. The method of claim 1, wherein the source code files including the program artifacts affected by the selected program statement comprise components of an application program.

3. The method of claim 1, wherein determining the program statements having as one input parameter one program artifact affected by the selected program statement further comprises:
determining program statements in the source code files having as one input parameter the program artifact that is one output parameter to the selected program statement.

4. The method of claim 1, further comprising:
outputting information on determined program statements and program artifacts affected by each selected program statement.

5. The method of claim 1, wherein the program artifact comprises a variable, Input/Output buffer or file.

6. The method of claim 1, wherein one program statement has one input parameter that is affected by the selected program statement if the output parameter program artifact of the selected program statement is the input parameter program artifact to the program statement.

7. The method of claim 6, wherein one statement further has one input parameter that is affected by the selected program statement if the output parameter program artifact of the selected program statement is the input parameter program artifact to the program statement or if the output parameter program artifact of one statement other than the selected program statement has as one input parameter one program artifact affected by the selected program statement.

8. The method of claim 1, wherein if the selected program statement comprises a call to a program routine comprised of a plurality of statements in one of the source code files, then one statement has one input parameter that is affected by the selected program statement if:
the output parameter program artifact of the selected source code statement is the input parameter program artifact to the statement; or
the input parameter of the selected source code statement is the input parameter program artifact to the statement.

9. The method of claim 1, further comprising:
accessing the source code files from a control management system.

10. The method of claim 1, further comprising:
performing recursively the determination of program statements throughout the source code files.

11. The method of claim 10, wherein the program statements have as one input parameter one program artifact that is the output parameter of one previously determined program statement.

12. The method of claim 11, wherein the one previously determined program statement has as one input parameter one program statement affected directly or indirectly by the selected source program statement.

13. The method of claim 12, further comprising:
generating information on each program artifact referenced as an output parameter in at least one program statement.

14. The method of claim 13, further comprising:
determining program statements in the source code file having as one input parameter one program artifact that is affected by the selected source program statement.

15. The method of claim 12, further comprising:
determining program statements in the source code file having as one input parameter one program artifact that is affected by the selected source program statement.

16. The method of claim 11, wherein the one previously determined program statement has as one input parameter one program statement affected directly by the selected source program statement.

17. The method of claim 1, wherein the recursive calls are made during impact analysis routine.

18. The method of claim 1, wherein for each program statement referencing a modified variable as an input variable, an impact analysis routine makes a recursive call to the impact analysis routine.

19. A method for performing an impact analysis of program statements in a source code file that is one of a plurality of source code files, wherein each program statement has at least one of an input parameter and output parameter, comprising:
receiving selection of at least one program statement in one source code file; and
for each selected program statement, determining program statements throughout the source code files having as one input parameter one program artifact that is affected by the selected program statement, wherein determining the program statements having as one input parameter one program artifact affected by the selected program statement further comprises determining program statements in the source code files having as one input parameter the program artifact that is one output parameter to the selected program statement, wherein determining the program statements having as one input parameter one program artifact affected by the selected program statement further comprises:
for each previously determined program statement having as one input parameter one program artifact affected by the selected program statement, performing the steps of:
(i) determining the output parameter program artifact of the statement; and
(ii) determining program statements in the source code files having as one input parameter the program artifact that is the output parameter of the previously determined statement, wherein determining the program statements having as one input parameter one program artifact affected by the selected program statement further comprises:
for each previously determined program statement having as one input parameter one program artifact that is the output parameter of one previously determined program statement having as one input parameter one program statement affected directly or indirectly by the selected source program statement, performing the steps of:
(a) determining the output parameter program artifact of the determined program statement;
(b) determining program statements in the source code files having as one input parameter the program artifact that is the output parameter of the determined program statement; and
(c) performing recursively the determination of program statements having as one input parameter one program artifact that is the output parameter of one previously determined program statement having as one input parameter one program statement affected directly or indirectly by the selected source statement.

20. A system for performing an impact analysis of program statements in a source code file that is one of a plurality of source code files, wherein each program statement has at least one of an input parameter and output parameter, comprising:
means for receiving selection of at least one program statement in one source code file; and
means for determining, for each selected program statement, program statements throughout the source code files having as one input parameter one program artifact that is affected by the selected program statement, wherein recursive calls are made for determining the program statements throughout the source code files having as one input parameter one program artifact that is affected by the selected source program statement, wherein the means for determining the program statements having as one input parameter one program artifact affected by the selected program statement further performs:
for each previously determined program statement having as one input parameter one program artifact affected by the selected program statement, performing the steps of:
(i) determining the output parameter program artifact of the statement: and
(ii) determining program statements in the source code files having as one input parameter the program artifact that is the output parameter of the previously determined statement.

21. The system of claim 20, wherein the source code files including the program artifacts affected by the selected program statement comprise components of an application program.

22. The system of claim 20, wherein the means for determining the program statements having as one input parameter one program artifact affected by the selected program statement further performs:
determining program statements in the source code files having as one input parameter the program artifact that is one output parameter to the selected program statement.

23. The system of claim 20, further comprising:
means for outputting information on determined program statements and program artifacts affected by each selected program statement.

24. The system of claim 20, wherein the program artifact comprises a variable, Input/Output buffer or file.

25. The system of claim 20, wherein one program statement has one input parameter that is affected by the selected program statement if the output parameter program artifact of the selected program statement is the input parameter program artifact to the program statement.

26. The system of claim 25, wherein one statement further has one input parameter that is affected by the selected program statement if the output parameter program artifact of the selected program statement is the input parameter program artifact to the program statement or if the output parameter program artifact of one statement other than the selected program statement has as one input parameter one program artifact affected by the selected program statement.

27. The system of claim 20, wherein if the selected program statement comprises a call to a program routine comprised of a plurality of statements in one of the source code files, then one statement has one input parameter that is affected by the selected program statement if:
the output parameter program artifact of the selected source code statement is the input parameter program artifact to the statement; or
the input parameter of the selected source code statement is the input parameter program artifact to the statement.

28. The system of claim 20, further comprising:
means for accessing the source code files from a control management system.

29. The system of claim 20, further comprising:
means for performing recursively the determination of program statements throughout the source code files.

30. The system of claim 29, wherein the program statements have as one input parameter one program artifact that is the output parameter of one previously determined program statement.

31. The system of claim 30, wherein the one previously determined program statement has as one input parameter one program statement affected directly or indirectly by the selected source program statement.

32. The system of claim 31, further comprising:
means for generating information on each program artifact referenced as an output parameter in at least one program statement.

33. The system of claim 32, further comprising:
means for determining program statements in the source code file having as one input parameter one program artifact that is affected by the selected source program statement.

34. The system of claim 31, further comprising:
means for determining program statements in the source code file having as one input parameter one program artifact that is affected by the selected source program statement.

35. The system of claim 30, wherein the one previously determined program statement has as one input parameter one program statement affected directly by the selected source program statement.

36. The system of claim 20, wherein the recursive calls are made during impact analysis to an impact analysis routine.

37. The system of claim 20, wherein for each program statement referencing a modified variable as an input variable, an impact analysis routine makes a recursive call to the impact analysis routine.

38. A system for performing an impact analysis of program statements in a source code file that is one of a plurality of source code files, wherein each program statement has at least one of an input parameter and output parameter, comprising:
means for receiving selection of at least one program statement in one source code file; and
means for determining, for each selected program statement, program statements throughout the source code files having as one input parameter one program artifact that is affected by the selected program statement, wherein the means for determining the program statements having as one input parameter one program artifact affected by the selected program statement further performs determining program statements in the source code files having as one input parameter the program artifact that is one output parameter to the selected program statement, wherein the means for determining the program statements having as one input parameter one program artifact affected by the selected program statement further performs for each previously determined program statement having as one input parameter one program artifact affected by the selected program statement:
(i) determining the output parameter program artifact of the statement; and
(ii) determining program statements in the source code files having as one input parameter the program artifact that is the output parameter of the previously determined statement, wherein the means for determining the program statements having as one input parameter one program artifact affected by the selected program statement further performs for each previously determined program statement having as one input parameter one program artifact that is the output parameter of one previously determined program statement having as one input parameter one program statement affected directly or indirectly by the selected source program statement:
(a) determining the output parameter program artifact of the determined program statement;
(b) determining program statements in the source code files having as one input parameter the program artifact that is the output parameter of the determined program statement; and
(c) performing recursively the determination of program statements having as one input parameter one program artifact that is the output parameter of one previously determined program statement having as one input parameter one program statement affected directly or indirectly by the selected source statement.

39. An article of manufacture including code for performing an impact analysis of program statements in a source code file that is one of a plurality of source code files, wherein each program statement has at least one of an input parameter and output parameter, by:
receiving selection of at least one program statement in one source code file; and
for each selected program statement, determining program statements throughout the source code files having as one input parameter one program artifact that is affected by the selected program statement, wherein recursive calls are made for determining the program statements throughout the source code files having as one input parameter one program artifact that is affected by the selected source program statement, wherein determining the program statements having as one input parameter one program artifact affected by the selected program statement further comprises:
for each previously determined program statement having as one input parameter one program artifact affected by the selected program statement, performing the steps of:
(i) determining the output parameter program artifact of the statement; and
(ii) determining program statements in the source code files having as one input parameter the program artifact that is the output parameter of the previously determined statement.

40. The article of manufacture of claim 39, wherein the source code files including the program artifacts affected by the selected program statement comprise components of an application program.

41. The article of manufacture of claim 39, wherein determining the program statements having as one input parameter one program artifact affected by the selected program statement further comprises:
determining program statements in the source code files having as one input parameter the program artifact that is one output parameter to the selected program statement.

42. The article of manufacture of claim 39, further comprising:
outputting information on determined program statements and program artifacts affected by each selected program statement.

43. The article of manufacture of claim 39, wherein the program artifact comprises a variable, Input/Output buffer or file.

44. The article of manufacture of claim 39, wherein one program statement has one input parameter that is affected by the selected program statement if the output parameter program artifact of the selected program statement is the input parameter program artifact to the program statement.

45. The article of manufacture of claim 44, wherein one statement further has one input parameter that is affected by the selected program statement if the output parameter program artifact of the selected program statement is the input parameter program artifact to the program statement or if the output parameter program artifact of one statement other than the selected program statement has as one input parameter one program artifact affected by the selected program statement.

46. The article of manufacture of claim 39, wherein if the selected program statement comprises a call to a program routine comprised of a plurality of statements in one of the source code files, then one statement has one input parameter that is affected by the selected program statement if:
the output parameter program artifact of the selected source code statement is the input parameter program artifact to the statement; or
the input parameter of the selected source code statement is the input parameter program artifact to the statement.

47. The article of manufacture of claim 39, further comprising:
accessing the source code files from a control management system.

48. The article of manufacture of claim 39, wherein the code further performs recursive determination of program statements throughout the source code files.

49. The article of manufacture of claim 48, wherein the program statements have as one input parameter one program artifact that is the output parameter of one previously determined program statement.

50. The article of manufacture of claim 49, wherein the one previously determined program statement has as one input parameter one program statement affected directly or indirectly by the selected source program statement.

51. The article of manufacture of claim 50, wherein the code further performs:
generating information on each program artifact referenced as an output parameter in at least one program statement.

52. The article of manufacture of claim 51, wherein the code further performs:
determining program statements in the source code file having as one input parameter one program artifact that is affected by the selected source program statement.

53. The article of manufacture of claim 50, wherein the code further performs:
determining program statements in the source code file having as one input parameter one program artifact that is affected by the selected source program statement.

54. The article of manufacture of claim 49, wherein the one previously determined program statement has as one input parameter one program statement affected directly by the selected source program statement.

55. The article of manufacture of claim 39, wherein the recursive calls are made during impact analysis to an impact analysis routine.

56. The article of manufacture of claim 39, wherein for each program statement referencing a modified variable as an input variable, an impact analysis routine makes a recursive call to the impact analysis routine.

57. An article of manufacture including code for performing an impact analysis of program statements in a source code file that is one of a plurality of source code files, wherein each program statement has at least one of an input parameter and output parameter, by:

receiving selection of at least one program statement in one source code file; and for each selected program statement, determining program statements throughout the source code files having as one input parameter one program artifact that is affected by the selected program statement, wherein determining the program statements having as one input parameter one program artifact affected by the selected program statement further comprises determining program statements in the source code files having as one input parameter the program artifact that is one output parameter to the selected program statement, wherein determining the program statements having as one input parameter one program artifact affected by the selected program statement further comprises:

for each previously determined program statement having as one input parameter one program artifact affected by the selected program statement, performing the steps of:

(i) determining the output parameter program artifact of the statement; and (ii) determining program statements in the source code files having as one input parameter the program artifact that is the output parameter of the previously determined statement, wherein determining the program statements having as one input parameter one program artifact affected by the selected program statement further comprises:

for each previously determined program statement having as one input parameter one program artifact that is the output parameter of one previously determined program statement having as one input parameter one program statement affected directly or indirectly by the selected source program statement, performing the steps of:

(a) determining the output parameter program artifact of the determined program statement;

(b) determining all program statements in the source code files having as one input parameter the program artifact that is the output parameter of the determined program statement; and (c) performing recursively the determination of program statements having as one input parameter one program artifact that is the output parameter of one previously determined program statement having as one input parameter one program statement affected directly or indirectly by the selected source statement.

\* \* \* \* \*